US008584374B2

(12) United States Patent
Klapdohr et al.

(10) Patent No.: US 8,584,374 B2
(45) Date of Patent: Nov. 19, 2013

(54) METHOD FOR REMOVING WATER FROM A MIXTURE

(75) Inventors: Simone Klapdohr, Rosenheim (DE); Burkhard Walther, Garching (DE); Helmut Mack, Traunstein (DE); Zhizhong Cai, Trostberg (DE); Laurent Marc, Hericy (FR); Jochen Mezger, Garching an der Alz (DE); Tobias Austermann, Munster (DE); Silke Flakus, Ebersberg (DE)

(73) Assignee: Construction Research & Technology GmbH, Trostberg (DE)

( * ) Notice: Subject to any disclaimer, the term of this patent is extended or adjusted under 35 U.S.C. 154(b) by 509 days.

(21) Appl. No.: 13/002,139

(22) PCT Filed: May 28, 2009

(86) PCT No.: PCT/EP2009/056511
§ 371 (c)(1),
(2), (4) Date: Feb. 18, 2011

(87) PCT Pub. No.: WO2010/003734
PCT Pub. Date: Jan. 14, 2010

(65) Prior Publication Data
US 2011/0126421 A1 Jun. 2, 2011

(30) Foreign Application Priority Data

Jul. 8, 2008 (EP) .................................... 08104669

(51) Int. Cl.
*F26B 5/08* (2006.01)

(52) U.S. Cl.
USPC ................... 34/314; 34/315; 34/317; 34/318; 34/312; 34/323; 34/329; 34/381; 34/397; 159/11.2; 159/11.3; 159/49; 203/28; 203/59; 203/64; 203/89; 560/352

(58) Field of Classification Search
USPC ........... 34/314, 315, 317, 318, 321, 323, 329; 34/325, 92; 528/44; 205/333; 399/140; 203/28, 59, 64, 89; 159/11.2, 11.3, 49; 560/352
See application file for complete search history.

(56) References Cited

U.S. PATENT DOCUMENTS

| 2,932,901 | A | * | 4/1960 | Salem et al. ..................... 34/393 |
| 4,567,228 | A | * | 1/1986 | Gaa et al. ...................... 524/588 |
| 5,008,133 | A | * | 4/1991 | Herbet et al. .................. 427/333 |
| 6,060,627 | A |   | 5/2000 | Valbert |
| 6,858,189 | B1 |   | 2/2005 | Ramshaw et al. |
| 6,972,113 | B1 |   | 12/2005 | Ramshaw et al. |
| 6,977,063 | B1 |   | 12/2005 | Ramshaw et al. |
| 7,115,235 | B1 |   | 10/2006 | Ramshaw et al. |
| 7,247,202 | B1 |   | 7/2007 | Ramshaw et al. |
| 7,363,729 | B2 | * | 4/2008 | Tanaka et al. .................... 34/418 |
| 2002/0064717 | A1 | * | 5/2002 | Schneider et al. .............. 430/17 |
| 2007/0227034 | A1 | * | 10/2007 | Ogawa et al. ................... 34/444 |
| 2008/0058436 | A1 |   | 3/2008 | Mautino et al. |
| 2008/0104861 | A1 | * | 5/2008 | Yahiro ........................... 34/463 |
| 2011/0126421 | A1 | * | 6/2011 | Klapdohr et al. ............... 34/325 |
| 2011/0132551 | A1 | * | 6/2011 | Klapdohr et al. ............. 159/49 |
| 2012/0167410 | A1 | * | 7/2012 | Abate et al. .................... 34/443 |

FOREIGN PATENT DOCUMENTS

| EP | 1 894 955 A1 | 3/2008 | | |
| WO | WO 00/48728 | 8/2000 | | |
| WO | WO 00/48729 | 8/2000 | | |
| WO | WO 00/48730 | 8/2000 | | |
| WO | WO 00/48731 | 8/2000 | | |
| WO | WO 00/48732 | 8/2000 | | |
| WO | WO 2010003734 A1 * | 1/2010 | .............. | B01D 1/14 |
| WO | WO 2010003770 A1 * | 1/2010 | ............. | C08G 18/75 |

OTHER PUBLICATIONS

Boodhoo, K. V. K., et al, "Process intensification: spinning disk reactor for styrene polymerisation", Applied Thermal Engineering, Jan. 1, 2000, vol. 20, No. 12, pp. 1127-1146.
Janchuck, R. J., et al., "Process Intensification: The Opportunity Presented By Spinning Disc Reactor Technology", Institution Chemical Engineers Symposium, Jan. 1, 1997, vol. 141, pp. 417-424, XP001247804.
PCT/EP2009/056511—International Search Report, Jul. 13, 2009.

* cited by examiner

*Primary Examiner* — Steve M Gravini
(74) *Attorney, Agent, or Firm* — Curatolo Sidoti Co., LPA; Joseph G. Curatolo; Salvatore A. Sidoti

(57) ABSTRACT

The invention relates to a method for removing water from a mixture containing at least one compound having at least one group reactive towards isocyanate and containing water, the mixture being applied to the surface of a rotating body A, the mixture flowing over the surface of the rotating body A to an outer region of the surface of the rotating body A and water evaporating from the mixture. In particular, this method is suitable for removing water from alcohols and amines.

14 Claims, No Drawings

METHOD FOR REMOVING WATER FROM A MIXTURE

CROSS REFERENCE TO RELATED APPLICATIONS

This application is a national stage application of International Application No. PCT/EP2009/056511, filed 28 May 2009, which claims priority from European Patent Application Serial No. 08 104 669.0, filed 8 Jul. 2008, from which applications priority is claimed, and which are incorporated herein by reference.

The present invention relates to a method for removing water from a mixture which contains at least one compound having at least one group reactive towards isocyanate and contains water.

A multiplicity of methods for removing water from mixtures is known in the prior art. The water content of organic compounds is of decisive importance for countless chemical reactions, the presence of water frequently leading to a higher consumption of starting materials, to undesired by-products or, for example in certain catalytic processes, to complete blocking of the desired reaction. Thus, for example in polyurethane or polyurea preparation, the water content of the raw materials plays an important role since water reacts with the isocyanate compounds used. This leads to undesired by-products which have a disadvantageous effect on the product properties. Here, water is introduced into the reaction especially via the polyalcohol or polyamine component used. In industrial practice, it is therefore usual in the preparation of polyurethane or polyurea to use an isocyanate excess corresponding to the water contents. For removing the water from the polyalcohol or polyamine component, however, it is possible according to the prior art also to use, for example, an azeotropic distillation. This has the generally known disadvantages, such as long loading and unloading times, poor heat and mass transfer, varying quality of the products, residues of the entrainer, etc. Furthermore, the polyalcohol or polyamine component is exposed to a long thermal load which, depending on the substrate used, can lead to undesired by-products and thus also adversely affect the quality of the polyurea or of the polyurethane.

An object of the present invention was to provide an economical method for removing water from mixtures which contain at least one compound having at least one group reactive towards isocyanate and contain water, which method is flexible in terms of the process. The method should be capable of being carried out in a simple manner and ensure a good and reproducible product quality.

This object is achieved by a method for removing water from a preferably liquid mixture containing at least one preferably organic compound having at least one group, preferably at least two groups, reactive towards isocyanate and containing water, the mixture being applied to the surface of a rotating body A, the mixture flowing over the surface of the rotating body A to an outer region of the rotating body A and water evaporating from the mixture in the process.

The rotating body A may be disc-shaped, vase-shaped, annular or conical, a horizontal rotating disc, a rotating disc deviating from the horizontal by up to 45° C. being regarded as preferred. Usually, the body A has a diameter of 0.10 m to 3.0 m, preferably 0.20 m to 2.0 m and particularly preferably of 0.20 m to 1.0 m. The surface may be smooth or may have, for example, ripple-like or spiral mouldings which influence the mixing and residence time of the reaction mixture. Expediently, the body A is installed in a container which is resistant with regard to the conditions of the method according to the invention.

The rotational speed of the body A and the metering rate of the mixture are variable. Usually, the rate of revolution and revolutions per minute is 1 to 20 000, preferably 100 to 5000 and particularly preferably 200 to 200 000. The volume of the reaction mixture which is present on the rotating body A per unit area of the surface is typically 0.03 to 40 ml/dm$^2$, preferably 0.1 to 10 ml/dm$^2$, particularly preferably 1.0 to 5.0 ml/dm$^2$. The average residence time (frequency mean of the residence time spectrum) of the mixture is, inter alia, dependent on the size of the surface, on the type of compound and the amount of water present, on the temperature of the surface and on the rate of revolution of the rotating body A and is usually between 0.01 and 60 seconds, particularly preferably between 0.1 and 10 seconds, in particular 1 to 7 seconds, and is therefore to be regarded as extremely short. This ensures that the extent of possible decomposition reactions and the formation of undesired products is greatly reduced and hence the quality of the substrates is retained.

In a preferred embodiment of the invention, the removal of the water is carried out by means of an apparatus which has α) a body A rotating about a preferably centrally arranged axis of rotation and β) a metering system.

In a further embodiment, the apparatus may have a quench device. The quench device is preferably present as at least one cooling wall which surrounds the rotating disc and which the mixture strikes after leaving the surface. In this embodiment, the method according to the invention ensures that the mixture from which the water is to be removed can be strongly heated by the body A in a very short time, thermally promoted, undesired secondary reactions being prevented by the subsequent quenching. The abrupt cooling by means of the quench device is effected within at most five seconds, preferably within only one second.

For effective removal of the water, it may also be expedient to pass the mixture several times over the surface of the rotating body A. In a further embodiment of the invention, the surface extends to further rotating bodies so that the mixture passes from the surface of the rotating body A to the surface of at least one further rotating body. The further rotating bodies are expediently constituted in the manner corresponding to the body A. Typically, body A then feeds the further bodies with the reaction mixture. The reaction mixture leaves this at least one further body and can then, if required, be cooled abruptly by means of the quench device.

It is to be regarded as being preferred that the mixture is present on the surface of the rotating body A in the form of a film which has an average thickness between 0.1 μm and 6.0 mm, preferably between 60 and 1000 μm and in particular 100 and 500 μm.

The temperature of the rotating body A, in particular of the surface facing the mixture, can be varied within wide ranges and depends both on the substrates used and the residence time on the body A and on the pressure. Temperatures between 5 and 300° C., particularly preferably between 25 and 240° C., in particular between 150 and 230° C., have proved to be expedient. The mixture applied to the body A and/or the rotating body A can be heated, for example, electrically, by means of a heat transfer liquid, with steam, with a laser, with microwave radiation or by means of infrared radiation.

The method according to the invention can be carried out at atmospheric pressure or slightly superatmospheric pressure and in an atmosphere of dry inert gas. However, it may also be expedient to generate a vacuum, in general pressures between 0.01 mbar and 1100 mbar, particularly preferably between 1 mbar and 500 mbar, in particular between 10 mbar and 400 mbar, have proved to be advantageous. A preferred embodiment of the present invention furthermore envisages that the evaporated water will be expelled with a gas or dry air, in particular inert gas.

It has furthermore proved to be expedient to condense the evaporated water on a body having a temperature of between −196° C. and 100° C., particularly preferably between −78 and 80° C., in particular between −20 and 30° C. In this context, the preferred embodiment envisages that the rotating body A is surrounded by at least one surface on which water can condense, it being preferred that the surface has an inclination so that the condensed water is removed by gravitation along the surface of the rotating body A.

However, it may also be expedient to heat the surfaces surrounding the body A in order to prevent condensation of water. In this embodiment, the water vapour can be removed by a vacuum or an inert gas stream.

The water content of the mixtures used is not critical. In particular, the method according to the invention is suitable if the water content of the mixture directly before application to the surface of the rotating body A is between 0.001 and 5% by weight, particularly preferably between 0.005 and 1% by weight, in particular between 0.01 and 0.5% by weight, based on the total weight of the mixture. It is to be regarded as being preferred here that the water content in the mixture after removal of the water by evaporation on the surface of the rotating body A is between 0.0001 and 1% by weight, particularly preferably between 0.001 and 0.2% by weight, in particular between 0.002 and 0.1% by weight, based on the total weight of the mixture.

The content of the compound having at least one group reactive towards isocyanate in the mixture is in general between 30 and 99.999% by weight, particularly preferably between 70 and 99.995% by weight, in particular between 95 and 99.99% by weight, based on the total weight of the mixture, directly before application to the surface of the rotating body A.

In the context of the present invention, in particular alcohols and amines, particularly preferably polyols and/or polyamines, are suitable as the compound having at least one group reactive towards isocyanate. These contain one to 10, preferably two to 10 and particularly preferably two or three hydroxyl groups and/or amino groups and have a number average molecular weight between 32 and 20 000, particularly preferably between 90 and 18 000 g/mol. Suitable polyols are preferably the polyhydroxy compounds which are liquid, glassy solid/amorphous or crystalline at 25° C. It is to be regarded as being preferred here that the polyhydroxy compounds which are not liquid at 25° C. are liquefied before application to the disc, in particular by melting.

Difunctional polypropylene glycols may be mentioned as typical examples. Random copolymers and/or block copolymers of ethylene oxide and of propylene oxide which have hydroxyl groups can also preferably be used. Suitable polyether polyols are the polyethers known per se in polyurethane chemistry, such as the polyols prepared using initiator molecules from styrene oxide, propylene oxide, butylene oxide, tetrahydrofuran and epichlorohydrin. In particular, poly(oxytetramethylene) glycol (poly-THF), 1,2-polybutylene glycol or mixtures thereof are also specifically suitable. In particular, polypropylene oxide and polyethylene oxide and mixtures thereof are suitable. However, it is also possible to use alkylated polyethers, such as, for example, methylpolyethylene glycol (MPEG). A further copolymer type which can be used as the polyol component and which has terminal hydroxyl groups is according to the general formula (preparable, for example, by means of "controlled" high-speed anionic polymerization according to Macromolecules 2004, 37, 4038-4043):

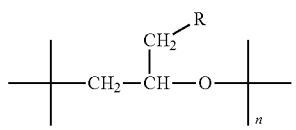

in which R is identical or different and is preferably represented by OMe, OiPr, Cl or Br.

In particular, the polyester di- or polyols which are liquid, glassy amorphous or crystalline at 25° C. and can be prepared by condensation of di- and tricarboxylic acids, such as adipic acid, sebacic acid, glutaric acid, azelic acid, suberic acid, undecanedioic acid, dodecanedioic acid, 3,3-dimethylglutaric acid, terephthalic acid, isophthalic acid, hexahydrophthalic acid and/or dimeric fatty acid, with low molecular weight diols, triols or polyols, such as ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimeric fatty alcohol, glycerol, pentaerythritol and/or trimethylolpropane, are furthermore suitable as the polyol component.

A further suitable group of polyols comprises the polyesters, for example, based on caprolactone, which are also referred to as "polycaprolactones". Further polyols which may be used are polycarbonate-polyols and dimeric diols and polyols based on vegetable oils and their derivatives, such as castor oil and derivatives thereof or epoxidized soybean oil. Also suitable are polycarbonates which have hydroxyl groups and are obtainable by reaction of carbonic acid derivatives, e.g. diphenyl carbonate, dimethyl carbonate or phosgene, with diols. For example, ethylene glycol, 1,2- and 1,3-propanediol, 1,3- and 1,4-butanediol, 1,6-hexanediol, 1,8-octanediol, neopentylglycol, 1,4-bishydroxymethylcyclohexane, 2-methyl-1,3-propanediol, 2,2,4-trimethylpentanediol-1,3, dipropylene glycol, polypropylene glycols, dibutylene glycol, polybutylene glycols, bisphenol A, tetrabromobisphenol A, glycerol, trimethylolpropane, 1,2,6-hexanetriol, 1,2,4-butanetriol, trimethylolpropane, pentaerythritol, chinitol, mannitol, sorbitol, methylglycoside and 1,3,4,6-dianhydrohexite are particularly suitable. The hydroxy-functional polybutadienes which are commercially available, inter alia, under the trade name "Poly-bd®" can also be used as polyols, as can the hydrogenated analogues thereof. Hydroxy-functional polysulphides which are marketed under the trade name "Thiokol® NPS-282" and hydroxy-functional polysiloxanes are furthermore suitable.

In particular, hydrazine, hydrazine hydrate and substituted hydrazines, such as N-methylhydrazine, N,N'-dimethylhydrazine, acid hydrazides, adipic acid, methyladipic acid, sebacic acid, hydracrylate acid, terephthalic acid, semicarbazidoalkylene hydrazides, such as 13-semicarbazidopropionic acid hydrazide, semicarbazidoalkylene carbazine esters, such as, for example, 2-semicarbazidoethyl carbazine ester, and/or aminosemicarbazide compounds, such as 13-aminoethylsemicarbazidocarbonate, are suitable as polyamines which can be used according to the invention.

Polyamines, for example those which are marketed under the trade name Jeffamine® (these are polyether polyamines) are also suitable.

Suitable polyols and/or polyamines are also the species known as so-called chain extenders, which react with excess isocyanate groups in the preparation of polyurethanes and polyureas, usually have a molecular weight ($M_n$) of less than 400 and are frequently present in the form of polyols, aminopolyols or aliphatic, cycloaliphatic or araliphatic polyamines.

Examples of chain extenders suitable for removing water are:

alkanediols, such as ethanediol, 1,2- and 1,3-propanediol, 1,4- and 2,3-butanediol, 1,5-pentanediol, 1,3-dimethylpropanediol, 1,6-hexanediol, neopentylglycol, cyclohexanedimethanol, 2-methyl-1,3-propanediol, etherdiols, such as diethylene diglycol, triethylene glycol or hydroquinone dihydroxyethyl ether hydroxybutyl hydroxycaproic acid ester, hydroxyhexyl hydroxybutyric acid ester, hydroxyethyl adipate and bishydroxyethyl terephthalate and polyamines, such as ethylenediamine, 1,2- and 1,3-diaminopropane, 1,4-diaminobutane, 1,6-diaminohexane, isomer mixtures of 2,2,4- and 2,4,4-trimethylhexamethylenediamine, 2-methylpentamethylenediamine, diethylenetriamine, 1,3- and 1,4-xylylenediamine and 4,4-diaminodicyclohexylmethane Finally, it should be mentioned that the polyols and/or polyamines may contain double bonds which may result, for example, from long-chain, aliphatic carboxylic acids or fatty alcohols. Functionalization with olefinic double bonds is also possible, for example, by the incorporation of vinylic or allylic groups. These may originate, for example, from unsaturated acids, such as maleic anhydride, acrylic acid or methacrylic acid and the respective esters thereof.

In this context, it has proved to be particularly surprising that the method according to the invention is also suitable in an outstanding manner for removing water from highly viscous liquids, it being possible to remove even very small amounts of water effectively. In addition to the viscosity, the chemical properties of the mixtures to be dried also play an important role. In particular, polyols and polyamines can be dried by the known methods according to the prior art only with complicated measures. The method according to the present invention gives outstanding results for these classes of substances too. Furthermore, the method according to the invention can be carried out with uncomplicated apparatus, relatively high substance throughputs being permitted. Thus, the claimed method provides a very economical alternative to the methods already known, even for implementation on the industrial scale.

The products obtained by the method according to the invention are also particularly suitable for reactions in which a low water content plays an important role. For example, the polyols and/or polyamines obtained by the method according to the invention can advantageously be used for the preparation of polyurethanes and polyureas. A particular embodiment of the present invention therefore envisages using the polyols and/or polyamines after evaporation of the water for reaction with isocyanate, preferably diisocyanate, the reaction being carried out in a reactor which has α) a hot body B rotating about an axis of rotation,
β) a metering system and
γ) a quench device,
a) the polyol and/or polyamine and the isocyanate being applied individually and/or as a mixture, optionally with further components, with the aid of the metering system to the surface of the rotating hot body B so that a film containing polyol and/or polyamine and isocyanate flows over the surface of the rotating hot body B to an outer region of the hot surface of the rotating body B,
b) the film leaving surface as a polyurethane-containing reaction mixture and
c) the reaction composition being cooled by means of the quench device after leaving the hot surface, particularly the cooling of the reaction mixture being at least 30° C., particularly preferably at least 50° C., in particular at least 100° C., and the temperature of the surface of the rotating body B being between 70 and 300° C., particularly preferably between 150 and 230° C.

Here, the rotating hot body B is expediently constituted to correspond to the body A. A particular advantage here is that both the removal of the water from the polyol and/or the polyamine and the subsequent preparation of the polyurethanes and/or the polyureas can be carried out with the same apparatus.

The molar ratio of the isocyanate groups with the isocyanate component used to the sum of the amino groups and/or hydroxyl groups of the polyols and/or amines used is preferably between 0.1 and 20, particularly preferably between 0.7 and 3, in particular between 0.8 and 2.5.

Advantageously, the catalyst suitable for the preparation of polyurethanes or polyureas is used as a component of the starting reaction mixture in the method according to the invention. Suitable catalysts are the customary catalysts of polyurethane chemistry which are known per se, such as acids, e.g. para-toluenesulphonic acid or tertiary amines, such as, for example, triethylamine, triethylenediamine (DABCO) or those which have atoms such as, for example, Sn, Mn, Fe, Co, Cd, Ni, Cu, Zn, Zr, Ti, Hf, Al, Th, Ce, Bi, Hg, N, P. The molar ratio of catalyst to isocyanate is dependent on the type of isocyanate and on the type of catalyst and is usually between 0 and 0.1, preferably 0 to 0.03.

The temperature of the hot body B and the contact time on this body are preferably established so that, after the cooling of the reaction mixture containing isocyanates and polyol, at least 93%, particularly preferably at least 98%, of the maximum amount of isocyanate groups which can be reacted with the amount of polyol and optionally amine used have reacted preferably with hydroxyl and optionally amino groups of the polyol and optionally amine.

Below, the invention is to be described in more detail with reference to working examples.

EXAMPLES

The following patent examples were carried out on a rotating body A which is designed as a smooth disc and consists of copper, the surface being chromium-plated. The disc is present on an axle and is surrounded by a metallic housing to which a vacuum can be applied. The disc is heated from inside with a heat-transfer oil. Comparable reactions are also described in more detail in the documents WO00/48728, WO00/48729, WO00/48730, WO00/48731 and WO00/48732.

Example 1

Drying of Polypropylene Glycol 4000 (PPG 4000) Having a Water Content of 0.50% by Weight in vacuo PPG 4000 (Acclaim® Polyol 4200, from Bayer AG) having a water content of 0.5% by weight (determination of the water content by Karl Fischer titration) is used. The body A, a smooth disc having a diameter of 20 cm, is heated here to 230° C. and rotated at 2000 rpm (rpm=revolutions per minute). At 200 mbar, the PPG 4000 is metered by means of a gear pump at 4 ml/s to the centre of the surface of the disc and flows outwards as a film owing to centrifugal forces. After leaving the disc, it is cooled on the housing wall perpendicular thereto and discharged from the metallic housing. The PPG 4000 leaves the system at about 100° C. and is collected in a sample bottle. The residual water content is 0.03%. Thus, 94% of the water present in the PPG 4000 have been removed. If the process is repeated, i.e. if the PPG 4000 already treated once is metered again onto the hot disc under the same conditions, the PPG 4000 is obtained with a water content of 0.01%.

Example 2

Drying of PPG 4000 Having a Water Content of 0.12% by Weight with a Stream of Nitrogen PPG 4000 (Acclaim® Polyol 4200, from Bayer AG) having a water content of 0.1% by weight (determination of the water content by Karl Fischer titration) is used. The body A, the smooth disc having a diameter of 20 cm, is heated here to 230° C. and rotated at 200 rpm. The nitrogen flows through the system. Inlet and outlet are present above the disc. The PPG 4000 is metered by means of a gear pump at 1 ml/s to the centre of the surface of the disc and flows outwards as a film owing to the centrifugal forces. After leaving the disc, the PPG 4000 is cooled on the housing wall perpendicular thereto and discharged from the metallic housing. The PPG 4000 is collected in a sample bottle. The residual water content is 0.03%.

Example 3

Drying of PPG 4000 Having a Water Content of 0.03% by Weight with a Stream of Nitrogen PPG 4000 (Acclaim® Polyol 4200, from Bayer AG) having a water content of 0.03% by weight (determination of the water content by Karl Fischer titration) is applied to the centre of the surface of a disc according to Example 1, which is heated to 230° C. The disc rotates at 200 rpm. Nitrogen flows through the system. Nitrogen inlet and outlet are present above the disc. The PPG 4000 is metered by means of a gear pump at 2 ml/s onto the disc and flows outwards as a film owing to the centrifugal forces. After leaving the disc, it is cooled on the housing wall perpendicular thereto and discharged from the metallic housing. The PPG 4000 leaves the system and is collected in a sample bottle. The residual water content is 0.01% by weight.

Example 4

Drying of Polypropylene Glycol 12000 (PPG 12000) Having a Water Content of 0.5% by Weight with Vacuum PPG 12000 (Acclaim® Polyol 12200 N, from Bayer AG) having a water content of 0.5% by weight (determination of the water content by Karl Fischer titration) is used. The body A, a smooth disc having a diameter of 20 cm, is heated here to 230° C. and rotated at 2000 rpm (rpm=revolutions per minute). At 200 mbar, the PPG 12000 is metered by means of a gear pump at 4 ml/s onto the centre of the surface of the disc and flows outwards as a film owing to the centrifugal forces. After leaving the disc, it is cooled on the housing wall perpendicular thereto and discharged from the metallic housing. The PPG 12000 leaves the system and is collected in a sample bottle. The residual water content is 0.03% by weight.

Comparative Example

Drying of PPG 4000 Having a Water Content of 0.06% by Weight by Azeotropic Distillation with n-hexane 2% by weight of n-hexane is added to PPG 4000 (Acclaim® Polyol 4200, from Bayer AG) having a water content of 0.06% by weight (determination of the water content by Karl Fischer titration) in a stirred tank and the n-hexane is removed with the water by azeotropic distillation at 96° C. in vacuo. The residual water content is 0.01% by weight after the distillation.

The invention claimed is:

1. Method for removing water from a mixture containing at least one compound having at least one group reactive towards isocyanate and containing water, wherein the mixture is applied to the surface of a rotating body A, the mixture flowing over the surface of the rotating body A to an outer region of the surface of the rotating body A and water evaporating from the mixture in the process.

2. Method according to claim 1, wherein the rotating body A is present as a rotating disc.

3. Method according to claim 1, wherein the removal of the water is carried out by means of an apparatus which has
α) a body A rotating about an axis of rotation and
β) a metering system.

4. Method according to claim 1, wherein the mixture is present on the surface of a rotating body A in the form of a film which has an average thickness between 0.1 μm and 6.0 mm.

5. Method according to claim 1, wherein the average residence time of the ingredients of the mixture on the surface of the rotating body A is between 0.01 and 60 seconds.

6. Method according to claim 1, wherein the temperature of the rotating body A is between 5 and 300° C.

7. Method according to claim 1, wherein the pressure at which the water is removed is between 0.01 mbar and 1100 mbar.

8. Method according to claim 1, wherein the evaporated water condenses on a body having a temperature between −196° C. and 100° C.

9. Method according to claim 1, wherein the evaporated water is expelled with a gas or dry air, optionally an inert gas.

10. Method according to claim 1, wherein the water content in the mixture directly before application to the surface of the rotating body A is between 5 and 0.001% by weight, based on the total weight of the mixture.

11. Method according to claim 1, wherein the water content of the mixture after removal of the water by evaporation on the surface of the rotating body A is between 0.0001 and 1% by weight, based on the total weight of the mixture.

12. Method according to claim 1, wherein the content of the compound having at least one group reactive towards isocyanate in the mixture directly before application to the surface of the rotating body A is between 30 and 99.999% by weight, based on the total weight of the mixture.

13. Method according to claim 1, wherein the compound having at least one group reactive towards isocyanate comprises alcohols and/or amines.

14. Method according to claim 1, wherein the mixture containing polyols and/or polyamines is used for reaction with isocyanate after evaporation of the water, the reaction being carried out in a reactor which has
- α) a hot body B rotating about an axis of rotation,
- β) a metering system and
- γ) a quench device,
- a) the polyol and/or polyamine and the isocyanate being applied individually and/or as a mixture, optionally with further components, with the aid of the metering system to the surface of the rotating hot body B so that a film containing polyol and/or polyamine and isocyanate flows over the surface of the rotating hot body B to an outer region of the hot surface of the rotating body B,
- b) the film leaving the surface as a polyurethane-containing reaction mixture and
- c) the reaction composition being cooled by means of the quench device after leaving the hot surface, particularly the cooling of the reaction mixture being at least 30° C., and the temperature of the surface of the rotating body B being between 70 and 300° C.

* * * * *